Oct. 12, 1926.   1,602,514
C. W. WEISS
TRANSMISSION DEVICE
Filed Nov. 25, 1924   2 Sheets-Sheet 1

INVENTOR
Carl W. Weiss
BY
Redding, Greeley, O'Shea Campbell
ATTORNEYS

Oct. 12, 1926. 1,602,514
C. W. WEISS
TRANSMISSION DEVICE
Filed Nov. 25, 1924  2 Sheets-Sheet 2

Patented Oct. 12, 1926.

1,602,514

UNITED STATES PATENT OFFICE.

CARL W. WEISS, OF BROOKLYN, NEW YORK.

TRANSMISSION DEVICE.

Application filed November 25, 1924. Serial No. 752,076.

In Letters Patent of the United States, No. 1,541,882, dated June 16, 1925, there is shown and described and covered broadly a transmission device of novel construction, together with a torque governor by which variation of the speed ratio is effected automatically through variation of the torque or resistance of the driven element. In the present application there is shown and described a transmission device of the same general character as that shown in the former application, with improved means for manual control and with an improved embodiment of the torque governor. The invention will be more fully explained hereinafter with reference to the accompanying drawings in which it is illustrated and in which—

Figure 1:
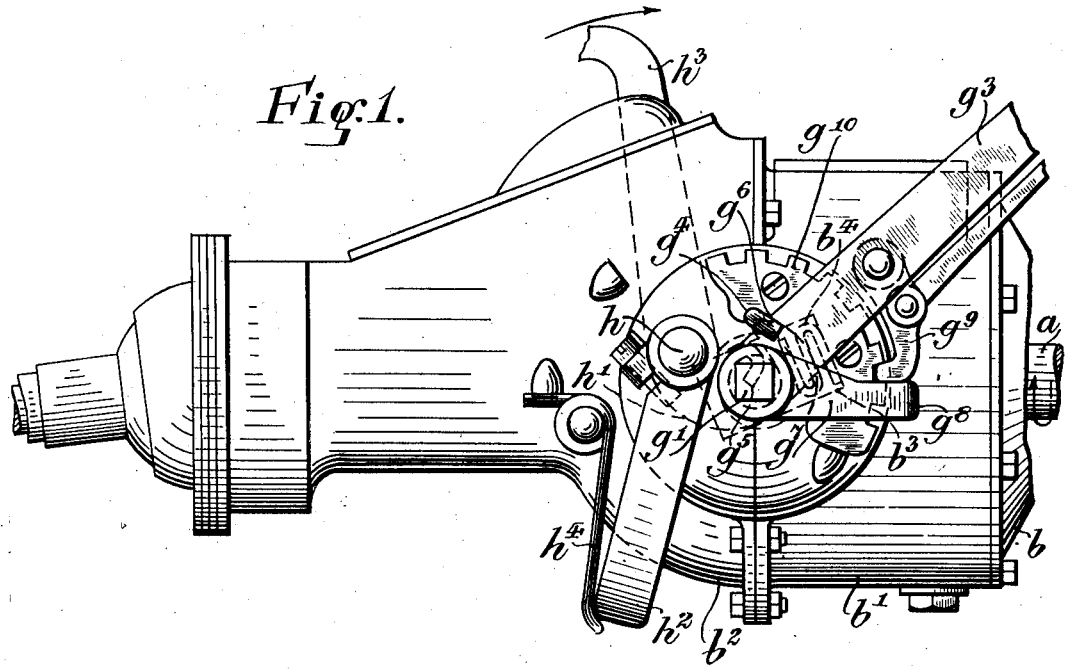
Figure 1 is a view of the improved transmission device in side elevation, some parts being broken off to save space.

In the embodiment of the invention shown in the drawings the driving part or shaft $a$ is shown as mounted for rotation in a suitable bearing carried by a plate $b$ which forms one member of a three-part housing $b$, $b'$, $b^2$. The shaft $a$ is shown as having secured thereto a fly wheel $c'$ which is recessed and has firmly secured thereto the internally spherical driving member $c$, which in this instance is shown as substantially hemispherical. The mutor $d$ which, as described in the application above mentioned, cooperates with the driving member $c$, comprises a rotatable carrier $d'$, $d^2$ which is armed with gripping members $e$ for driving engagement with the driving member $c$, is supported so that its angular position with respect to the driving member can be varied and, in the present instance, so that it can be moved bodily toward and from the driving member, and is provided with a gear $f$ through which its rotation upon its own axis is transmitted to the axle or other part to be driven at a variable speed. The spindle $f'$ of the gear $f$ is mounted for rotation in the bearing member $d'$ of the carrier and is clamped tightly to the other member $d^2$ of the carrier. Since means are provided for moving the carrier toward or from the driving member $c$, to control the driving engagement of the gripping members $e$ with the driving member $c$, a ball bearing $f^2$ of ordinary construction may be provided between the members $d'$ and $d^2$ and the gripping members $e$ may themselves be mounted in bearings fixed to the carrier member $d^2$.

Figure 3:
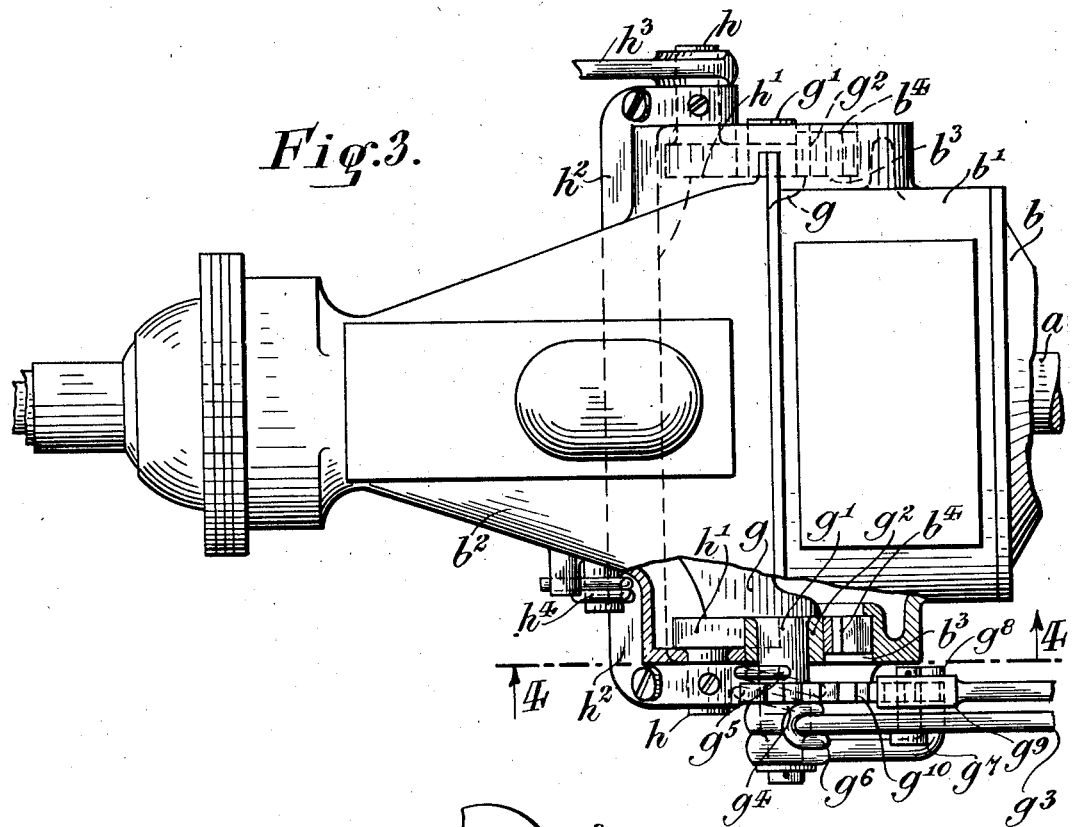
Figure 3 is a top view of the same with some parts in horizontal section and the housing partly broken away.
Figure 4:
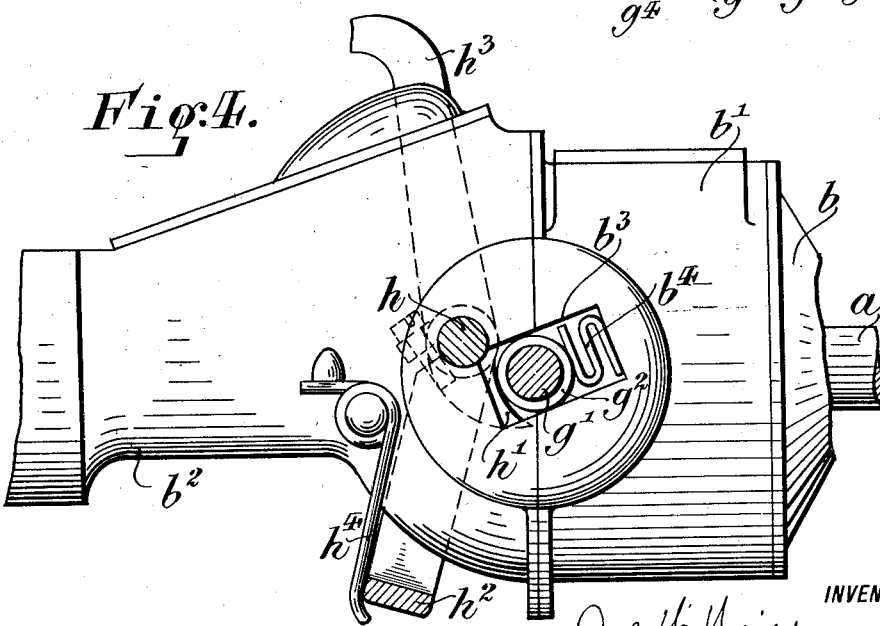
Figure 4 is a detail view in section on the plane indicated by the broken line 4—4 of Figure 3.

In order that the relative angular axial position of the mutor with respect to the coacting member may be varied to secure different ratios the mutor is supported by a main frame $g$ so that its angular position with respect to the coacting member $c$ can be varied about an axis which passes through the center of the spherical bearing surface, the frame $g$ having trunnions $g'$, one of which is shown in Figure 3, mounted in the housing $b'$, $b^2$. The trunnions are received in sleeves $g^2$ which are seated in slots $b^3$ of the housing, so as to permit movement of the frame and the carrier toward and from the driving member $c$. Springs $b^4$ are arranged to bear against the sleeves $g^2$ so as to hold the mutor normally out of driving contact with the spherical driving member $c$. Also mounted in the housing $b'$, $b^2$ are short shafts $h$ which carry within the housing cam arms $h'$ arranged to bear against the sleeves $g^2$ to move the mutor in opposition to the springs $b^4$. The two short shafts $h$ are connected by an external yoke $h^2$ so that they shall move together and to one of the short shafts $h$ is secured a lever arm $h^3$, such as the ordinary clutch pedal, by which the operator may move the mutor out of driving engagement with the driving member $c$. A spring $h^4$ may be applied to the yoke $h^2$, as shown in Figure 1, to hold the cam arms $h'$ normally in contact with the sleeves $g^2$ and the latter tightly against the springs $b^4$ and so press the mutor tightly into engagement with the spherical surface.

On one of the trunnions $g'$ is loosely mounted an operating lever $g^3$, by which the angular axial position of the mutor may be varied manually or at the will of the operator. Since the angular axial position of the mutor is also to be varied through variations in torque it is necessary that provision be made whereby the angular axial position of the mutor can be varied through variations in the torque regardless of the manual controlling means. Accordingly the operating lever $g^3$ is loosely mounted on the trunnion $g'$, as above stated, and is connected to the trunnion through the intermediary of a spring $g^4$ which is coiled around the trunnion and has one end seated in the trunnion, as indicated by broken lines at $g^5$ in Figures 1 and 3, and has the other end bent over the lever $g^3$ as indicated at $g^6$ in Figures 1 and 3. An arm $g^7$ is fixed on the trunnion $g'$, which is squared to receive it, the arm having its extremity bent under the operating lever $g^3$. Thereby the mutor can be shifted in angular position with respect to the driving element by the lever $g^3$ and can also be shifted through variation in torque, as will be explained, independently of the position of the lever $g^3$. The latter is provided with a detent $g^9$ for engagement with a fixed tooth sector $g^{10}$, so that the lever $g^8$ can be locked in any desired position, the detent $g^9$ being operated in the usual manner not necessary to be described.

The member $d'$ of the mutor carrier has hingedly connected thereto at $d^3$ a sleeve bearing $k$ which supports a gear $i$ for coaction with the gear $f$ of the mutor and one part or member $i'$ of a longitudinally extensible two-part shaft $i'$, $i^4$. The shaft member $i'$ is formed with a reversible helix $i^2$ for cooperation with the female member $i^3$ of the torque-responsive connection thus constituted, the female member $i^3$ being formed as a part of the other shaft member $i^4$ which is connected through a universal joint, indicated generally at $i^5$, with the shaft $i^6$ through which, in the present instance, power is transmitted to the part or parts to be driven, such as the driving wheels of an automobile, and is itself subject to the torque reaction of the driven part. The axis of the hinge joint $d^3$ is tangent to the pitch-line of the gears $f$ and $i$, the gears remaining in mesh throughout the angular displacement of the mutor. The sleeve bearing $k$ has itself a thrust bearing $i^7$ against a collar $i^8$ on the shaft member $i'$, so that as the two-part shaft is extended axially through relative rotation of the two parts by reason of the helix connecting $i^2$, $i^3$, when resistance is offered to the rotation of the shaft member $i^4$, the mutor will have its angular position shifted toward the zero position which is represented in Figure 2.

Figure 2:
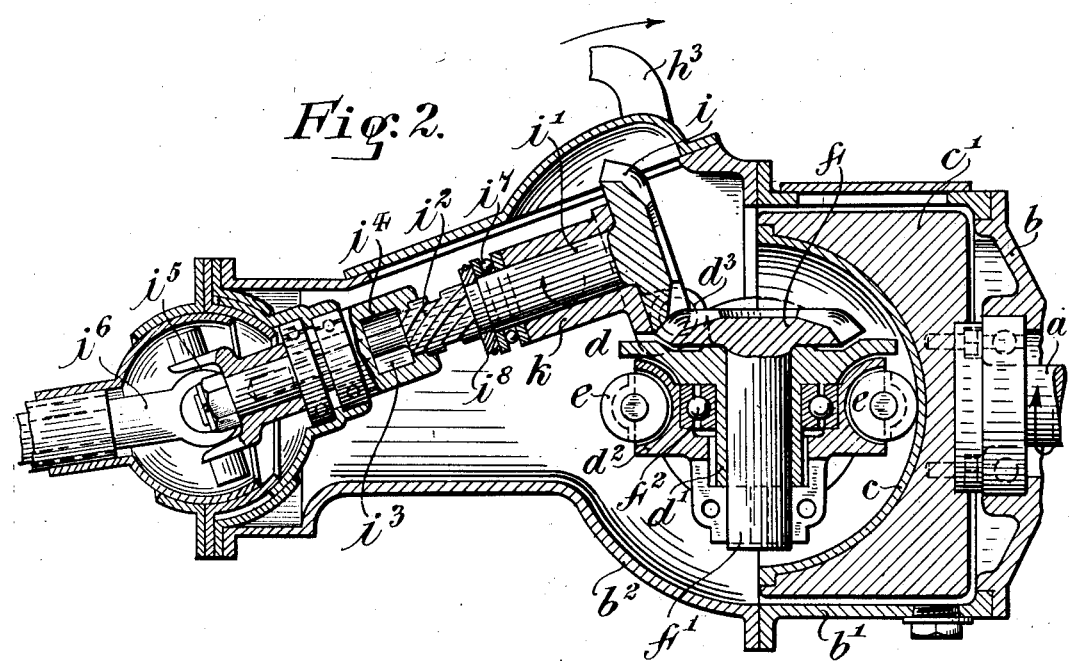
Figure 2 is a view of the same in longitudinal sectional elevation.

Let it be assumed, in explanation of the operation of the improved transmission device, that all of the parts are in the positions represented in Figures 1 and 2. When the drive shaft $a$ has been set in motion, with the internally spherical driving member $c$, the mutor is caused by pressure applied to the lever $h^3$ to be moved, against the pressure of the spring $b^4$, into driving contact with the driving element $c$. Through the lever $g^3$ the mutor is then shifted from its zero position, being moved up from the position shown in Figure 1 for going ahead or moved down for reverse. Assuming that the lever be moved up for going ahead the inertia of the car is gradually overcome and the desired speed of forward movement is established. If then the resistance to the forward movement is increased, as when an automobile enters upon an up-grade, the torque reaction, acting through the torque connection $i^2$ of the hinge joint $d^3$, will swing the mutor toward the zero position until, through the decrease of speed and increase of power, the resistance is overcome and the movement of the driven part is continued. When the resistance is diminished, as when the climbing of the up-grade has been accomplished, the speed increases automatically, as the mutor, by decreased torque of the driven shaft assumes its previous position, which is limited by contact of the arm $g^7$ and detent $g^9$. The speed can be further increased by further movement of the lever $g^3$ or through operation of the accelerator or other motor control.

It will be understood that various changes in details of construction and arrangement can be made to suit different conditions of use and that the invention, except as pointed out in the claims, is not limited to the precise construction shown and described herein.

I claim as my invention:

1. A power transmission device comprising a driving element, a driven element, one of said elements being capable of being changed in position with respect to the other element to vary the speed ratio of the two elements, a gear carried by the element capable of being changed in position, a carrier for the element capable of being changed in position, a two-part longitudinally extensible shaft, a gear at one end of said shaft for cooperation with the first named gear, a universal bearing for the other end of said shaft, a sleeve having a thrust bearing on said shaft and a hinged connection with said carrier, and means whereby a relative rotation of the two parts of the shaft effects a relative longitudinal displacement thereof.

2. A power transmission device comprising a driving element, a driven element, cne of said elements being capable of being changed in position with respect to the other element to vary the speed ratio of the two elements, a gear carried by the element capable of being changed in position, a carrier for the element capable of being changed in position, a two-part longitudinally extensible shaft, a gear at one end of said shaft for cooperation with the first named gear, a universal bearing for the other end of said shaft, a sleeve having a thrust bearing on said shaft and a hinged connection with said carrier, and a reversible helix connection between the two parts of said shaft.

3. A power transmission device comprising a rotating body having a spherical bearing surface, and a coacting member comprising a carrier which forms one of the transmission elements and is rotatable about an axis transverse to the axis of the bearing surface through the center of the bearing surface, gripping elements supported by the carrier about the axis to rotate with the carrier and themselves rotatable about axes transverse to the axis of the carrier, and means for moving the carrier bodily toward and from the spherical bearing surface.

4. A power transmission device comprising a support, a rotating body having a spherical bearing surface, a frame mounted in the support on an axis transverse to the axis of the rotating body and capable of being rocked on said axis and of being shifted toward and from the spherical bearing surface, the support having bearings for the frame to permit such movement, springs acting on the ends of the frame to press the frame away from the bearing surface, means under the control of the operator to press the frame toward the bearing surface against the springs, a rotating carrier supported by said frame, and gripping elements mounted on the carrier for coaction with the spherical bearing surface.

5. A power transmission device comprising a support, a rotating body having a spherical bearing surface supported thereby, a frame having trunnions mounted in said support on an axis transverse to the axis of the rotating body and capable of being rocked on said axis, a rotating carrier supported by said frame, gripping elements mounted on said carrier for co-operation with the spherical bearing surface, an operating lever mounted loosely on one of said trunnions, a spring connection between said trunnion and said lever, an arm fixed on said trunnion, and arranged for cooperation with said lever, and independent means to rock said frame on its axis.

6. A power transmission device comprising a support, a rotating body having a spherical bearing surface supported thereby, a frame having trunnions mounted in said support on an axis transverse to the axis of the rotating body and capable of being rocked on said axis, a rotating carrier supported by said frame, gripping elements mounted on said carrier for co-operation with the spherical bearing surface, an operating lever mounted loosely on one of said trunnions, a spring connection between said trunnion and said lever, an arm fixed on said trunnion and arranged for co-operation with said lever, transmission devices in operative relation with said carrier including a torque-responsive device, and operative connections between said torque-responsive device and said frame to rock the same on its axis.

This specification signed this 24th day of November A. D. 1924.

CARL W. WEISS.